US008840402B2

(12) United States Patent
Korneliussen

(10) Patent No.: US 8,840,402 B2
(45) Date of Patent: Sep. 23, 2014

(54) MANIKIN WITH SIMULATION OF AGONAL BREATHING

(75) Inventor: Kjell Ove Korneliussen, Sandnes (NO)

(73) Assignee: Laerdal Medical AS, Stavanger (NO)

(*) Notice: Subject to any disclaimer, the term of this patent is extended or adjusted under 35 U.S.C. 154(b) by 0 days.

(21) Appl. No.: 13/582,085

(22) PCT Filed: Mar. 4, 2011

(86) PCT No.: PCT/EP2011/053267
§ 371 (c)(1),
(2), (4) Date: Aug. 31, 2012

(87) PCT Pub. No.: WO2011/107578
PCT Pub. Date: Sep. 9, 2011

(65) Prior Publication Data
US 2012/0329023 A1 Dec. 27, 2012

(30) Foreign Application Priority Data
Mar. 5, 2010 (NO) .................................. 20100316

(51) Int. Cl.
*G09B 23/32* (2006.01)
*G09B 23/28* (2006.01)
(52) U.S. Cl.
CPC .............. *G09B 23/288* (2013.01); *G09B 23/32* (2013.01)
USPC ............................ 434/265; 434/270; 434/266
(58) Field of Classification Search
CPC ....... G09B 23/30; G09B 23/288; G09B 23/32

USPC .............................. 434/265, 266, 270; 601/41
See application file for complete search history.

(56) References Cited

U.S. PATENT DOCUMENTS

| 3,049,811 A | 8/1962 | Henning |
| 3,662,076 A | 5/1972 | Gordon et al. |
| 4,001,950 A | 1/1977 | Blumensaadt |
| 4,601,665 A * | 7/1986 | Messmore ..................... 434/267 |
| 4,838,263 A * | 6/1989 | Warwick et al. ................ 601/44 |
| 4,850,876 A * | 7/1989 | Lutaenko et al. ............. 434/265 |
| 2005/0048455 A1 | 3/2005 | Hayamizu et al. |
| 2008/0138779 A1 * | 6/2008 | Eggert et al. ................... 434/266 |
| 2008/0293028 A1 * | 11/2008 | Mestad et al. ................ 434/267 |

FOREIGN PATENT DOCUMENTS

| DE | 2144931 A1 * | 3/1972 |
| WO | WO-97/05591 A1 | 2/1997 |
| WO | WO-2005/032327 A2 | 4/2005 |

OTHER PUBLICATIONS

Beauce, Gaetan, "International Search Report" for PCT/EP2011/053267, as mailed Apr. 20, 2011, 4 pages.

* cited by examiner

Primary Examiner — Sam Yao
Assistant Examiner — Jennifer L Fassett
(74) Attorney, Agent, or Firm — Winstead PC

(57) ABSTRACT

The present invention provides a manikin comprising a chest area and a head, for training of cardiopulmonary resuscitation (CPR). The manikin is distinctive in that it comprises a means for providing gasping movements of the head, and a means for simulating the sound of agonal breathing, which means are operatively connected to a device for actuating said means, for simulation of agonal breathing.

13 Claims, 3 Drawing Sheets

MANIKIN WITH SIMULATION OF AGONAL BREATHING

FIELD OF THE INVENTION

Figure 1:
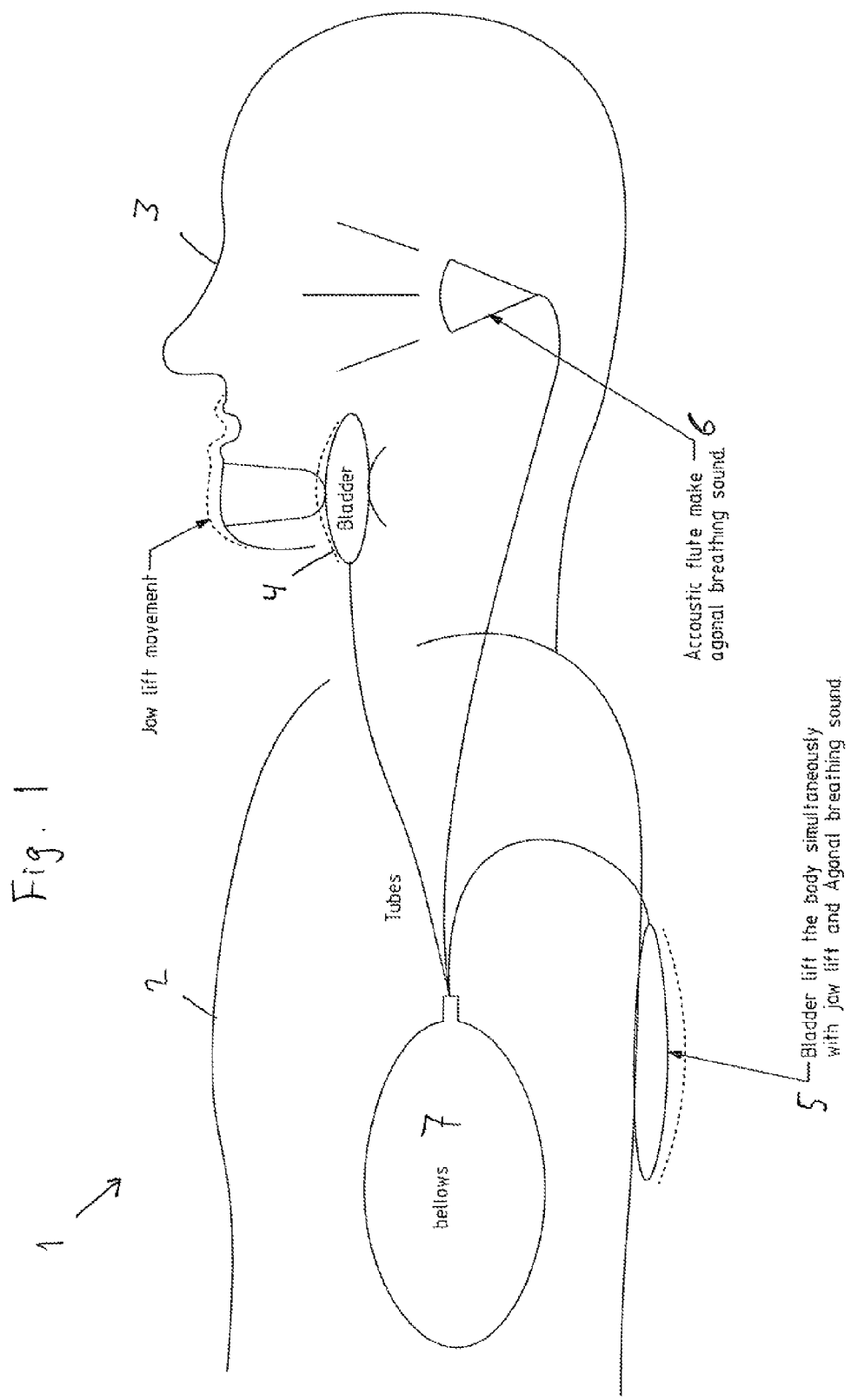

The present invention relates to health and life saving first aid. More specifically, the invention relates to a training manikin having means for simulation of agonal breathing.

BACKGROUND OF THE INVENTION AND PRIOR ART

Agonal breathing is an abnormal pattern of breathing distinctive by shallow, slow (3-4 per minute) irregular inspirations followed by irregular pauses. It may also be characterized by gasping, labored breathing, accompanied by strange vocalizations and mycolonus. Agonal breathing is an extremely serious medical sign requiring immediate medical attention, as the condition generally progresses to complete apnea and heralds death. Agonal breathing is the last breaths before death.

Bystanders to a sudden cardiac arrest often misinterpret the agonal breathing to mean the person is breathing and omit or delay commencement of cardiopulmonary resuscitation (CPR). A recent study published in Circulation: Journal of the American Heart Association, states that gasping, or agonal breathing, is an indication that the brain is still alive, and the victim has a higher chance of surviving.

Training of correct interpretation of and reaction to agonal breathing may increase the success rate of CPR significantly.

Currently there are no manikins for CPR-training available comprising means for simulation of agonal breathing. The objective of the present invention is therefore to provide a training manikin allowing the training to be more realistic also with respect to agonal breathing.

SUMMARY OF THE INVENTION

The present invention provides a manikin comprising a chest area and a head, for training of cardiopulmonary resuscitation (CPR). The manikin is distinctive in that it comprises a means for providing gasping movements of the head, and a means for simulating the sound of agonal breathing, which means are operatively connected to a device for actuating said means, for simulation of agonal breathing.

Preferably, the manikin also comprises a means for lifting of at least the shoulder area, which also is a typical sign of agonal breathing. In one preferable embodiment, the means for lifting of at least the shoulder area comprises at least one bladder arranged under the shoulders, preferably one bladder is arranged under each shoulder of the manikin or one larger bladder is arranged for lifting the whole upper body.

The means for providing gasping movements of the head is preferably a bladder or linear actuator operatively arranged to the jaw, for lifting and opening of the jaw. Other means can be used. The head is preferably also lifted whilst the jaw is opened. Gasping movement of the head means at least movement of the jaw or head, such as a gasping movement; preferably also further movement is induced upon actuation, such as lifting of the head and/or shoulders and even the whole upper body. The means for gasping movement of the head and the means for simulating the sound of agonal breathing can be one means providing two functions, which is an embodiment of the invention, which for example can be achieved by a bellow with a flute in the inlet of a connected hose for supplying or withdrawing air.

In one embodiment the means for simulating the sound of agonal breathing comprises a bladder operatively arranged to or in a soundbox, such that expansion of the bladder activates a power switch and a means for providing agonal breathing sound. Preferably a loudspeaker, an amplifier and a sound source is set into operation when the means for simulating the sound of agonal breathing is activated. More preferable when cost is a major parameter, the means for simulating the sound of agonal breathing is a non-electric flute device providing sound when air is blown through it. The means for simulating the sound of agonal breathing is preferably arranged in the head of the manikin, in order to be realistic.

In a preferable manikin of the invention, when low cost and reliability is a major concern, the actuation device is a bellow connected via tubes to: a bladder operatively arranged to the jaw, to one or more bladders arranged for lifting the shoulders and to a flute or a bladder for activating a sound means; such that deflation of the bellow will inflate said bladders and blow the flute, thereby actuating said means for simulation of agonal breathing.

The device and said means are chosen freely amongst pneumatic, hydraulic, electric and electrohydraulic devices or means that can be operatively arranged in combinations to actuate and simulate agonal breathing. For example, bladder means can be expanded and contracted by pneumatic actuation means such as a bellow, a small compressor or fan, connected via tubes.

For a manikin according to the invention when great realism is the governing design parameter, the device is an electronically activated device that can be actuated by wireless means or optionally by means integrated in the manikin. The device is operatively connected to at least one linear actuator for moving the head and/or jaw and at least one linear actuator for lifting the shoulders or upper body parts of the manikin, and the device is operatively connected to an electronic means for simulating the sound of agonal breathing, such as an MP3-player having stored agonal breathing sound in a flash memory. For such embodiments, a supervisor can actuate the means wirelessly for example with a computer from a neighbouring room, communicating with the electronically activate able device, thereby providing realistic training scenarios for students. In a preferable embodiment of the manikin of the invention, the device for actuating the means for simulation of agonal breathing is outside the manikin and/or integrated into said means, it is for example a computer with wireless communication directly to each of the means of the manikin for simulation of agonal breathing.

FIGURES

The invention is illustrated with three figures, namely

Figure 2:
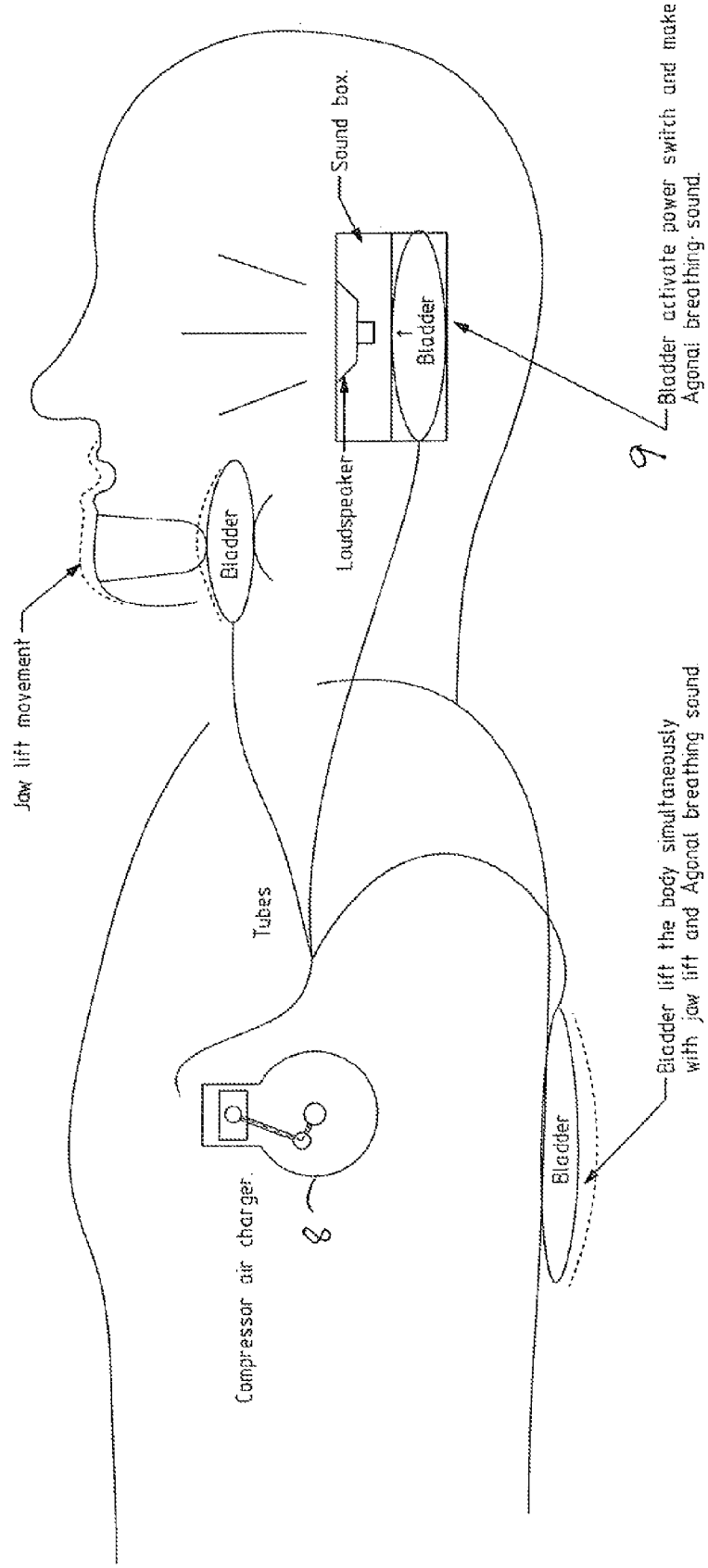

FIG. 1, illustrating an embodiment of a manikin of the present invention,

FIG. 2 illustrating an embodiment of a manikin of the present invention, and

Figure 3:
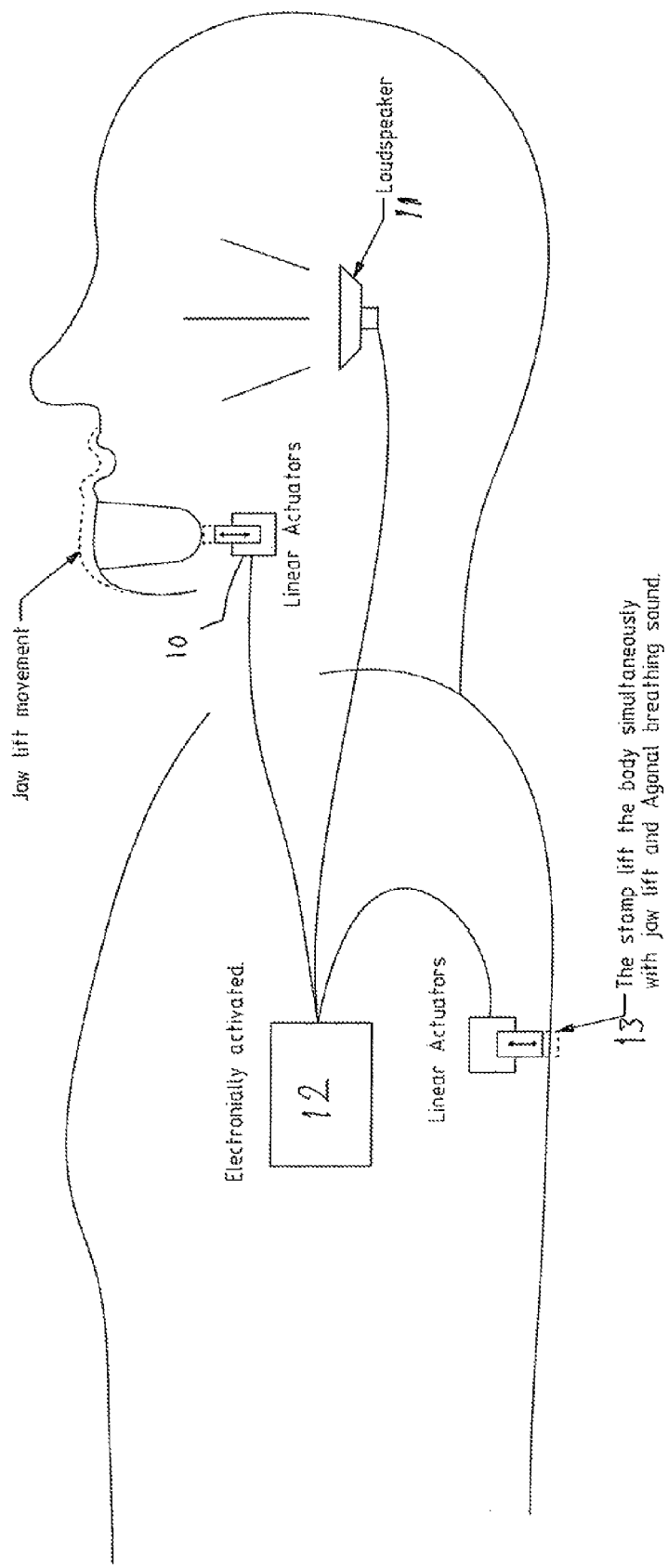

FIG. 3 illustrating a further embodiment of a manikin of the present invention.

DETAILED DESCRIPTION

Reference is made to FIG. 1, illustrating a manikin 1 of the invention. More specifically, the manikin 1 comprises a chest area 2 and a head 3, for training of cardiopulmonary resuscitation (CPR) by applying chest compressions and ventilations. A means 4 for lifting of the jaw, a means 5 for lifting of at least the shoulder area and a means 6 for simulating the sound of agonal breathing, are illustrated, which means are operatively connected to a device 7 for actuating said means, for simulation of agonal breathing.

The illustrated manikin is equipped with pneumatic means for providing simulation of agonal breathing. More specifically, the means 4 for lifting of the jaw comprises a bladder operatively arranged under the jaw, the means 5 for lifting of at least the shoulder area comprises at least one bladder arranged under the shoulders, the means 6 for simulating the sound of agonal breathing comprises an acoustic flute that can make agonal breathing sound. The device 7 for actuating said means for simulation of agonal breathing is a bellow connected via tubes to said bladders and flute, arranged such that deflation of the bellow will inflate said bladders and make sound in the flute simultaneously, and thereby actuate said means for simulation of agonal breathing.

Reference is made to FIG. 2, illustrating a further embodiment of a manikin of the invention, for which the bladder 7 has been replaced with a compressor air charger 8 and the flute 6 has been replaced with a soundbox 9 with a loudspeaker, an amplifier and a source having the sound stored for playing on activation by inflating a bladder in the soundbox. In all other respects the manikins of FIGS. 1 and 2 are identical.

Reference is made to FIG. 3, illustrating a more advanced manikin of the invention. For this embodiment the means for providing gasping movements of the head is a linear actuator 10 operatively arranged to lift and open the jaw upon activation, and the means for simulating the sound of agonal breathing is a loudspeaker 11, which means are operatively connected to an electronically activated device 12 for actuating said means, for simulation of agonal breathing. The manikin also includes a linear actuator 13 operatively arranged to the device 12 for lifting the body simultaneously with gasping movements and agonal breathing sound. The physical configuration is not necessarily as illustrated, for example can a wireless activation device, replacing the device 12, be integrated into each of the means 10, 11, 13, allowing wireless control.

The manikin of the invention may include any feature as described or illustrated in this document, in any operable combination in order to provide a beneficial effect, each such combination is an embodiment of the present invention.

The invention claimed is:

1. A manikin comprising:
    a chest area and a head for training of cardiopulmonary resuscitation (CPR);
    means for simulating gasping movements of a jaw; and
    means for simulating sound of agonal breathing, operatively arranged to provide agonal breathing sound out from the gasping jaw, which means for simulating sound of agonal breathing is operatively connected to a device for actuating said means for simulating sound of agonal breathing and movements of the jaw.

2. The manikin according to claim 1, wherein the manikin comprises means for lifting of at least a shoulder area of the manikin.

3. The manikin according to claim 1, wherein the means for simulating gasping movements of the jaw is a bladder operatively arranged to the jaw, for lifting and opening of the jaw.

4. The manikin according to claim 2, wherein the means for lifting of at least the shoulder area comprises at least one bladder arranged under the shoulders.

5. The manikin according to claim 1, wherein the means for simulating the sound of agonal breathing comprises a bladder operatively arranged to or in a soundbox, such that expansion of the bladder activates a power switch and means for providing agonal breathing sound.

6. The manikin according to claim 1, wherein the means for simulating the sound of agonal breathing is arranged in the head of the manikin.

7. The manikin according to claim 1, wherein the means for simulating the sound of agonal breathing is a non-electric flute device providing sound when air is blown through the non-electric flute device.

8. The manikin according to claim 1, comprising a bellow connected via tubes to: a first bladder operatively arranged to the jaw; one or more second bladders arranged for lifting a shoulder area; and a third bladder for activating a sound means, wherein deflation of the bellow will inflate the first bladder, the one or more second bladders, and the third bladder and thereby actuate said means for simulating sound of agonal breathing and said means for simulating gasping movements of the jaw.

9. The manikin according to claim 1, wherein said device and said means for simulating sound of agonal breathing and said means for simulating gasping movements of the jaw are chosen amongst pneumatic, hydraulic, electric, and electro-hydraulic devices that can be operatively arranged to actuate and simulate agonal breathing.

10. The manikin according to claim 1, wherein the device is an electronically actuated device that can be actuated by wireless means or optionally by means integrated in the manikin, the device is operatively connected to at least one linear actuator for moving at least one of the head and the jaw and at least one linear actuator for lifting a shoulders or upper body parts of the manikin, and the device is operatively connected to an electronic means for simulating the sound of agonal breathing.

11. The manikin according to claim 1, wherein the means for simulating gasping movements of the jaw is operatively connected to a device for simultaneously actuating the means for simulating sound of agonal breathing.

12. The manikin according to claim 2, wherein the means for simulating gasping movements of the jaw and the means for simulating sound of agonal breathing are actuated simultaneously with the means for lifting.

13. The manikin according to claim 10, wherein the electronic means for simulating the sound of agonal breathing is an MP3-player having stored agonal breathing sound in a flash memory.

* * * * *